(12) United States Patent
Zacher (10) Patent No.: US 7,937,861 B1
(45) Date of Patent: May 10, 2011

(54) EAR TAG RETAINER SYSTEM

(76) Inventor: Clayton S. Zacher, Elgin, ND (US)

( * ) Notice: Subject to any disclaimer, the term of this patent is extended or adjusted under 35 U.S.C. 154(b) by 369 days.

(21) Appl. No.: 12/136,098

(22) Filed: Jun. 10, 2008

(51) Int. Cl.
*G09F 3/00* (2006.01)
(52) U.S. Cl. ............................................. 40/301
(58) Field of Classification Search ............... 40/301; 81/426.5, 426, 424.5; 72/409.1, 409.13; 606/116, 117, 188; 119/655; 24/114.4, 114.05, 24/697.1
See application file for complete search history.

(56) References Cited

U.S. PATENT DOCUMENTS

| | | | |
|---|---|---|---|
| 495,270 A | 4/1893 | Rozell | |
| 1,910,750 A * | 5/1933 | Clark | 81/426.5 |
| 3,401,434 A * | 9/1968 | Daddona, Jr. | 24/689 |
| 3,595,201 A | 7/1971 | Oudenhoven | |
| 4,457,306 A * | 7/1984 | Borzone | 606/1 |
| 4,741,117 A | 5/1988 | Fearing | |
| 4,878,456 A | 11/1989 | Howe | |
| 4,958,452 A | 9/1990 | Tate | |
| 5,461,805 A | 10/1995 | Johnson | |
| 5,485,770 A * | 1/1996 | Popelak | 81/423 |
| 5,643,284 A | 7/1997 | Hicks | |
| D384,444 S | 9/1997 | Andrews | |
| 5,725,261 A | 3/1998 | Rahn | |
| 6,145,225 A | 11/2000 | Ritchey | |
| 6,145,226 A | 11/2000 | Finlayson | |
| 6,408,495 B2 * | 6/2002 | Ida | 24/702 |
| 2002/0010986 A1 * | 1/2002 | Fildan et al. | 24/689 |
| 2003/0182831 A1 * | 10/2003 | Haar et al. | 40/301 |

* cited by examiner

*Primary Examiner* — Joanne Silbermann (57) ABSTRACT

An ear tag retainer system for efficiently and easily securing an ear tag to an animal. The ear tag retainer system generally includes a retainer including a plurality of nodes, wherein the plurality of nodes extend from the retainer and a holder including a plurality of openings, wherein the plurality of openings receive the plurality of nodes when attaching an identification tag to an animal.

20 Claims, 7 Drawing Sheets

EAR TAG RETAINER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to ear tags and more specifically it relates to an ear tag retainer system for efficiently and easily securing an ear tag to an animal.

2. Description of the Related Art

Any discussion of the related art throughout the specification should in no way be considered as an admission that such related art is widely known or forms part of common general knowledge in the field.

Ear tags have been in use for years and are generally used on cattle to help identify the particular animal. Ear tags are also utilized on various other types of animals, such as but not limited to sheep and goats. Some general problems with many ear tags are that the ear tag retainers are lost over time resulting in various animals not being properly identified.

The ear tag retainers may not secure the ear tag for various reasons, such as the ear tag retainer breaking, rotting, becoming separated from the ear tag. This can cause considerable time and effort to identify the animal once again and attach another ear tag upon the animal. Because of the inherent problems with the related art, there is a need for a new and improved ear tag retainer system for efficiently and easily securing an ear tag to an animal.

BRIEF SUMMARY OF THE INVENTION

The general purpose of the present invention is to provide an ear tag retainer system that has many of the advantages of the ear tags mentioned heretofore. The invention generally relates to an ear tag which includes a retainer including a plurality of nodes, wherein the plurality of nodes extend from the retainer and a holder including a plurality of openings, wherein the plurality of openings receive the plurality of nodes when attaching an identification tag to an animal.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide an ear tag retainer system for efficiently and easily securing an ear tag to an animal.

Another object is to provide an ear tag retainer system that may be utilized on various types of animals, such as but not limited to cattle, sheep, hogs, goats, elk, deer, llama and alpaca.

An additional object is to provide an ear tag retainer system that remains secured to the animal for an extended duration of time.

A further object is to provide an ear tag retainer system that does not rot away.

Another object is to provide an ear tag retainer system that is easily attached to the animal.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
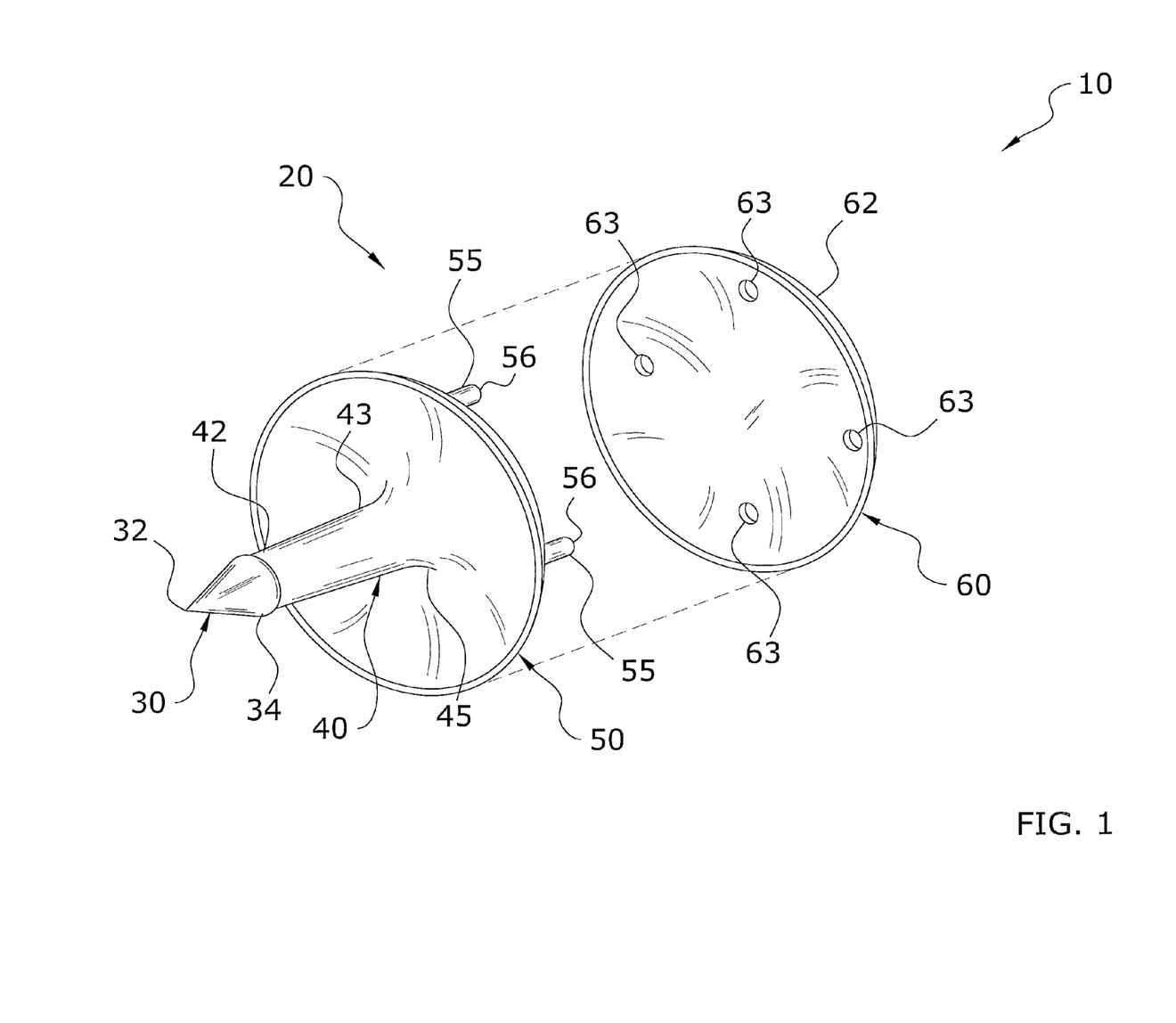
FIG. 1 is an exploded upper perspective view of the present invention.
Figure 2:
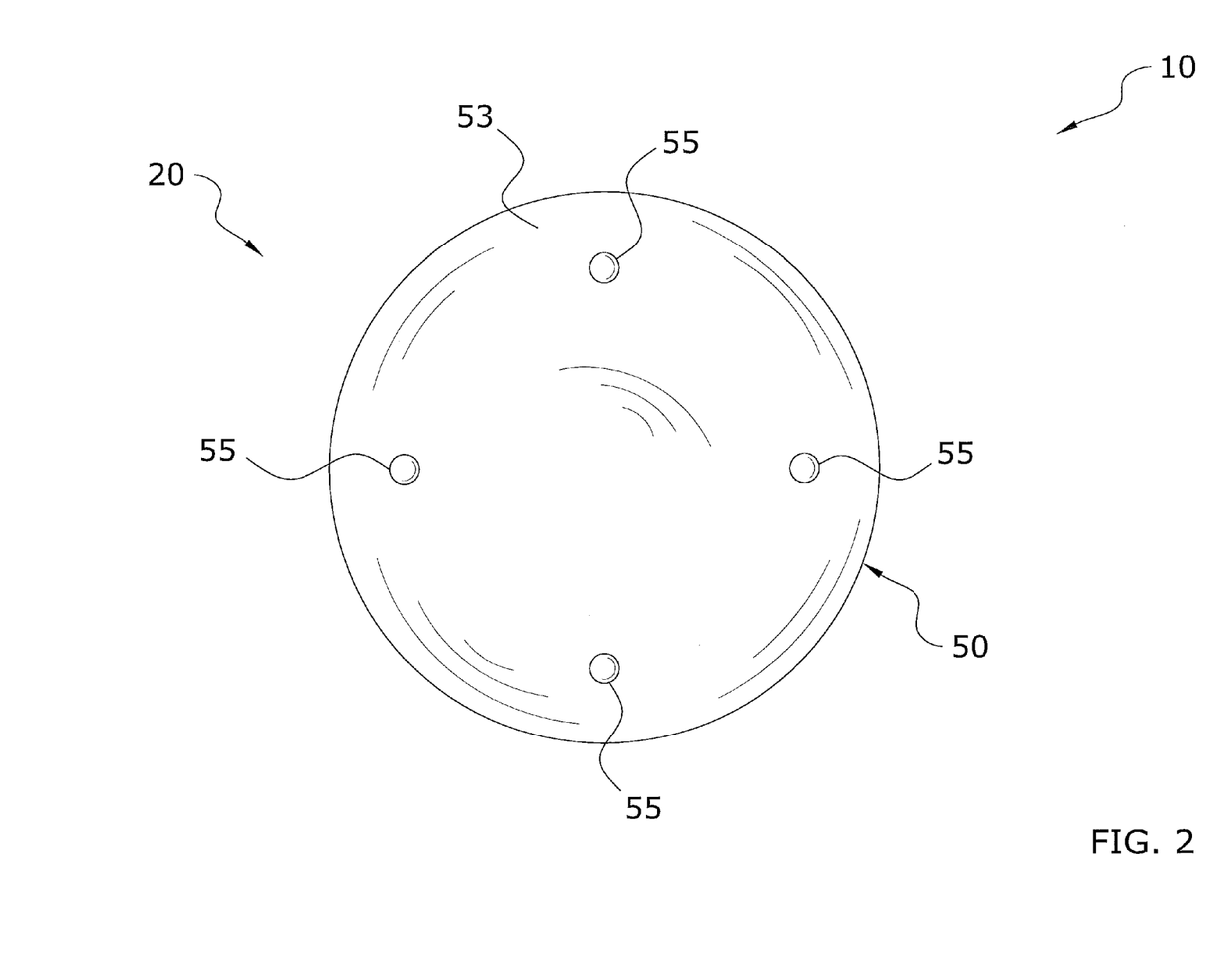
FIG. 2 is a rear view of the retainer illustrating the symmetric nodes.
Figure 3:
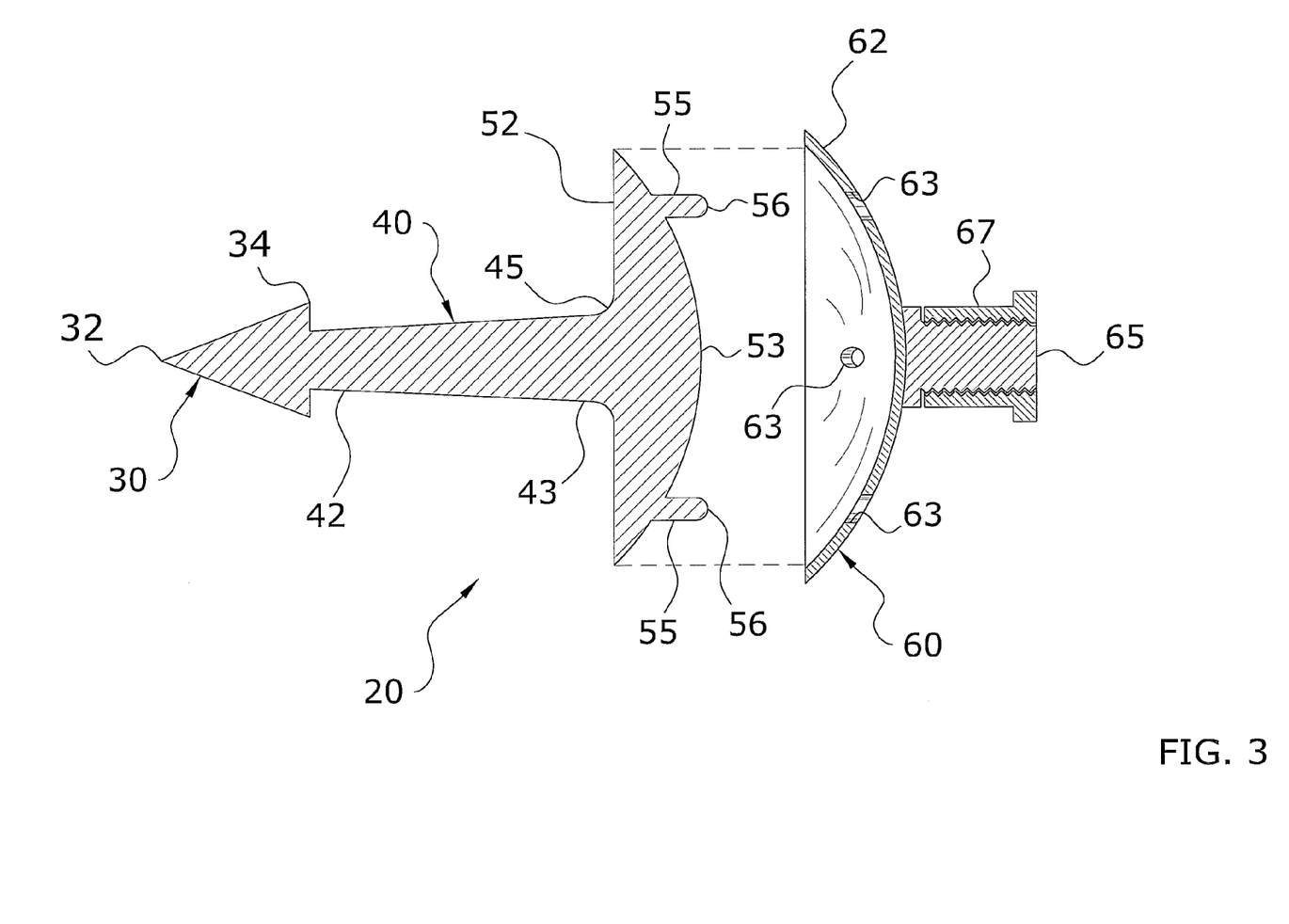
FIG. 3 is an exploded side cross sectional view of the present invention.
Figure 4:
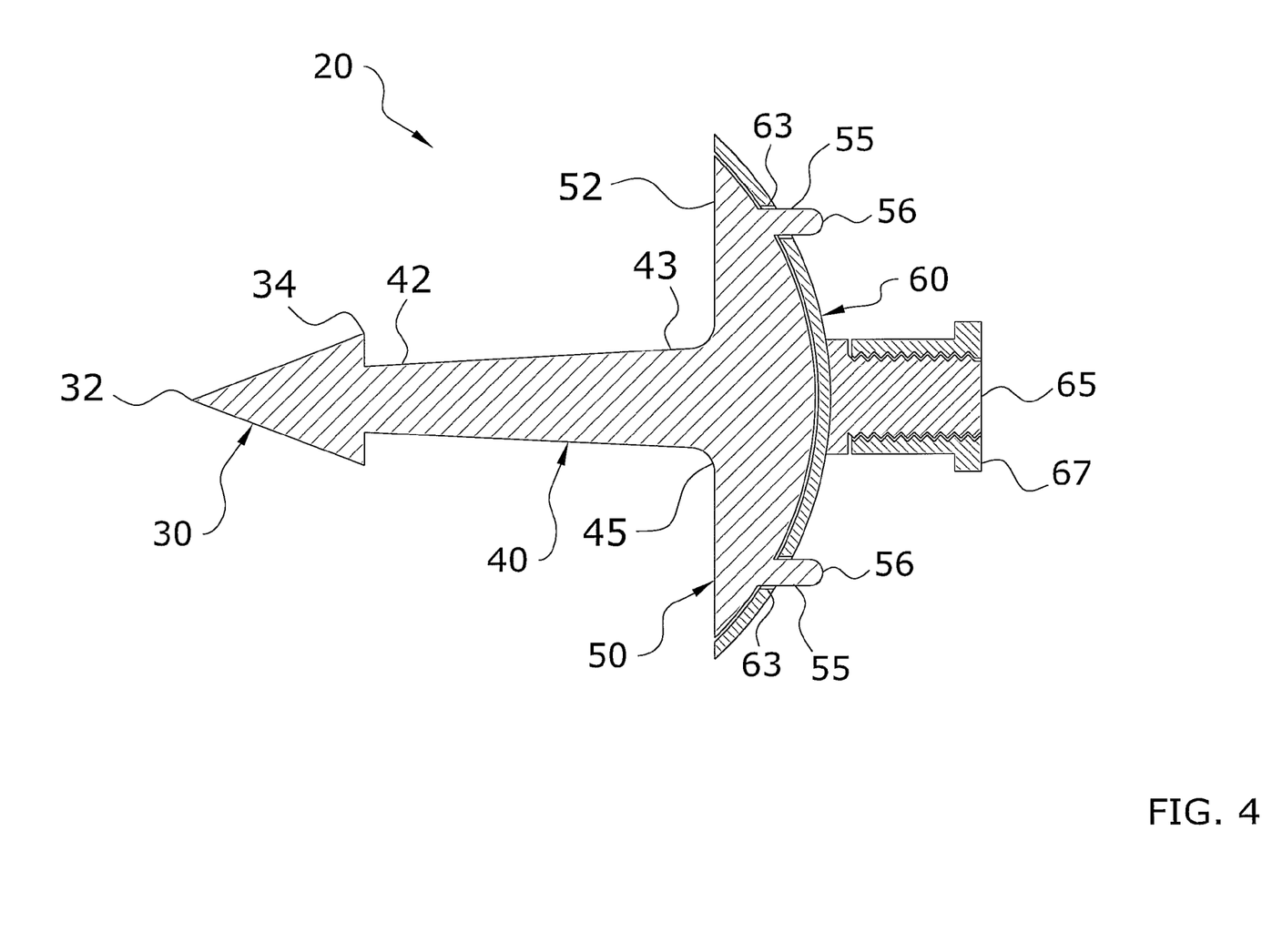
FIG. 4 is a side cross sectional view of the present invention.
Figure 5:
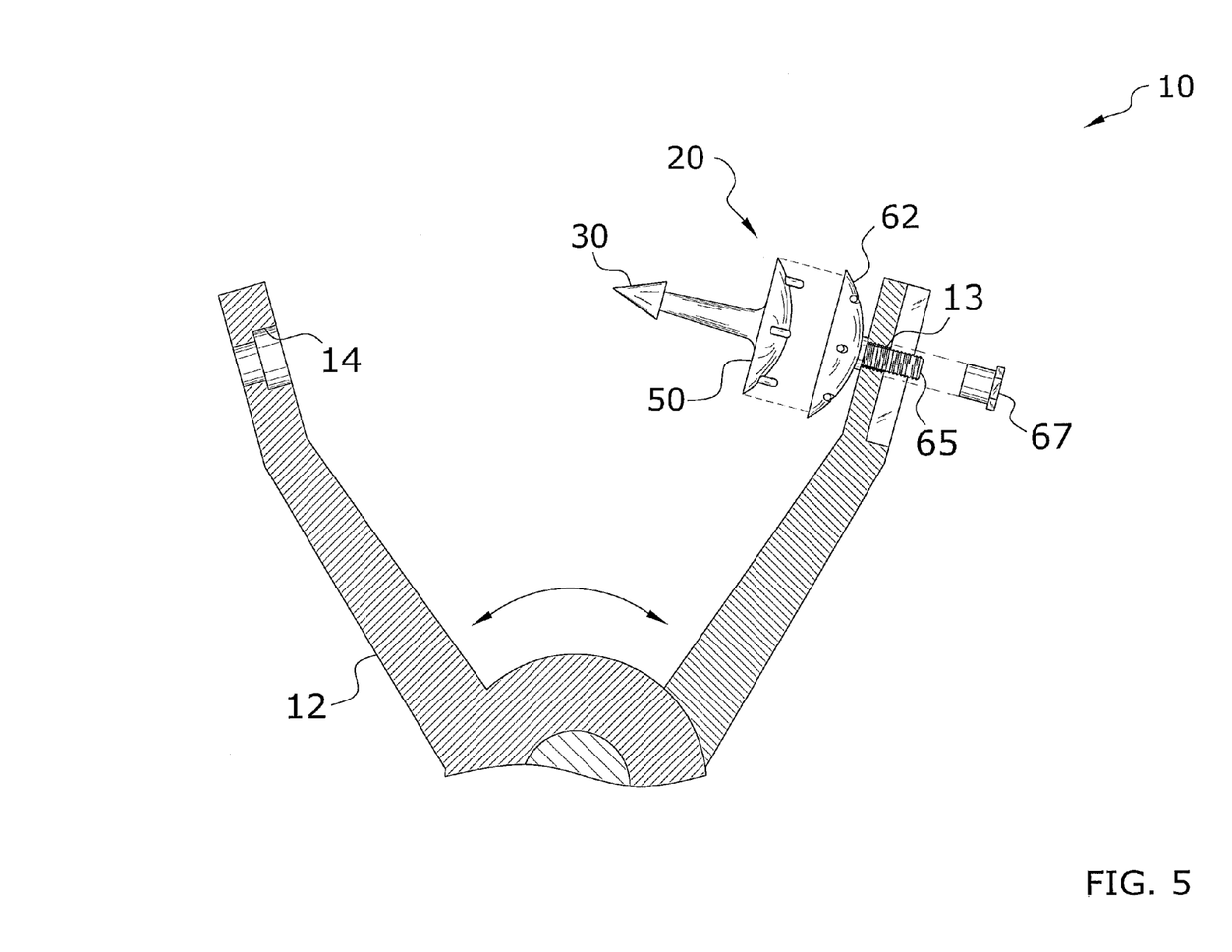
FIG. 5 is a side view of the present invention exploded from the press device.
Figure 6:
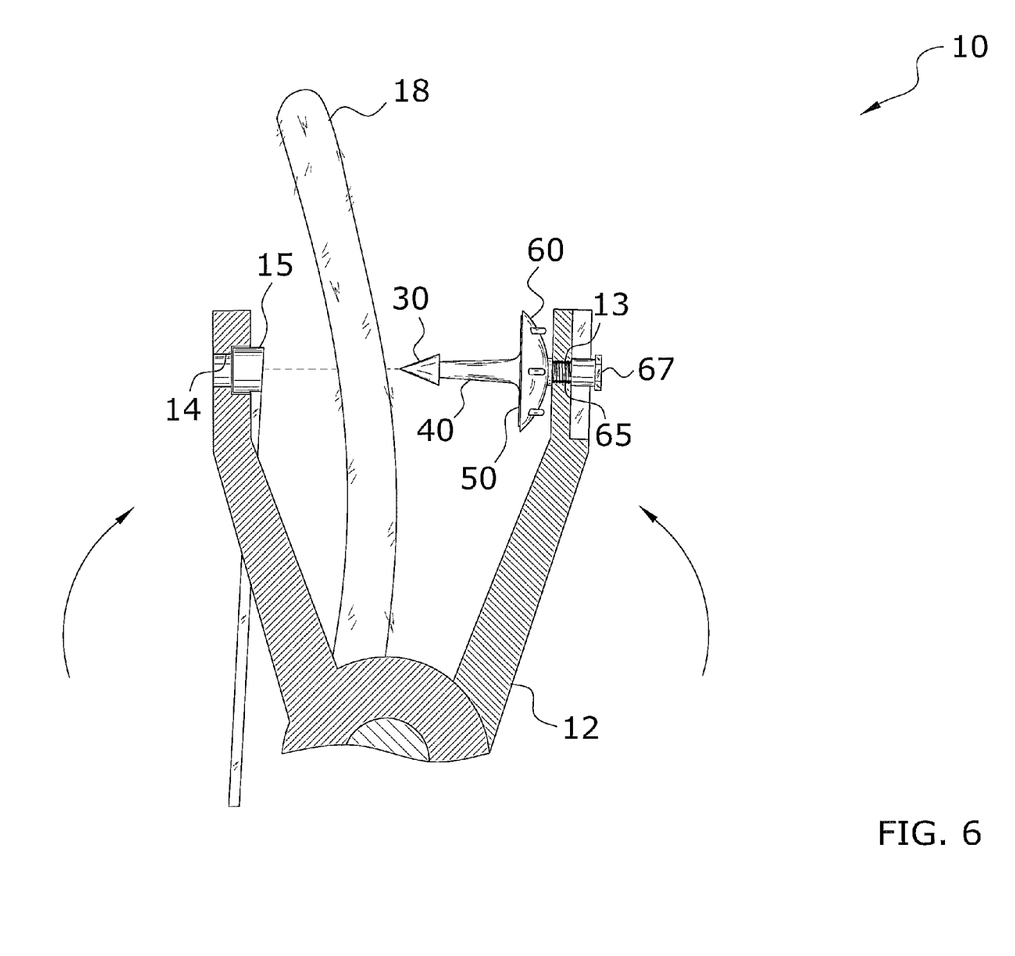
FIG. 6 is a side view of the present invention attached to the press device and in use.
Figure 7:
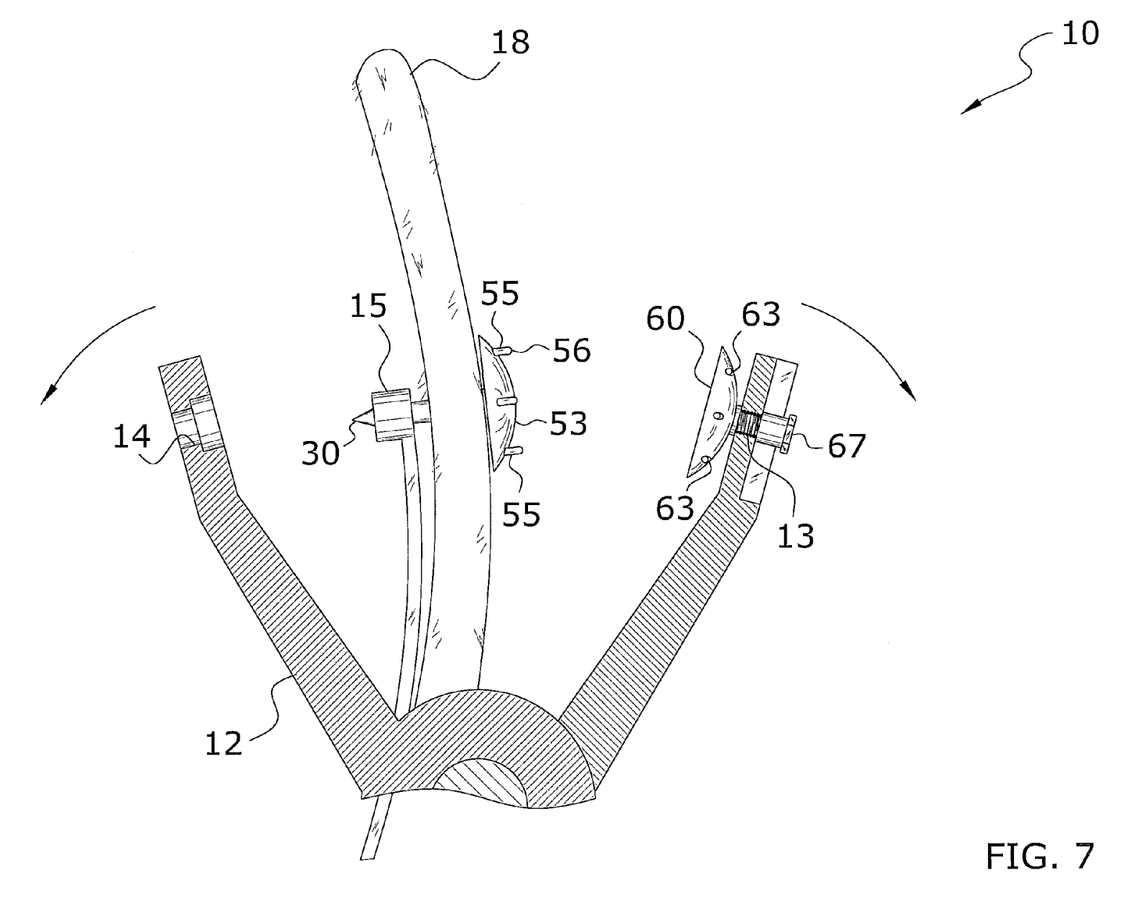
FIG. 7 is a side view of the present invention attached to an ear of an animal.

Turning now descriptively to the drawings, in which similar reference characters denote similar elements throughout the several views, FIGS. 1 through 7 illustrate an ear tag retainer system 10, which comprises a retainer 20 including a plurality of nodes 55, wherein the plurality of nodes 55 extend from the retainer 20 and a holder 60 including a plurality of openings 63, wherein the plurality of openings 63 receive the plurality of nodes 55 when attaching an identification tag 15 to an animal.

B. Retainer

The retainer 20 is utilized to secure an ear 18 tag 15 or other type of identification tag 15 to the animal (e.g. typically the ear 18 in cattle, sheep, goats or other domestic animals). It is appreciated however that the retainer 20 may be utilized to secure various identification tags 15 about various objects rather than the ear 18 of an animal. The retainer 20 is comprised of a durable and weather standing configuration that will not rot away over time due to prolonged exposure to weather elements and will not break off over time. In the preferred embodiment, the retainer 20 is comprised of a plastic or other composite material that is long lasting, strong and durable.

The retainer 20 includes a tip 30 to pierce the animal (e.g. ear 18 of the animal) or object, a shaft 40 extending from the tip 30 to extend through the ear 18 and a base 50 extending from shaft 40 to prevent the shaft 40 from being pulled through the ear 18 and the retainer 20 becoming loose from the ear 18. The tip 30, shaft 40 and base 50 are preferably comprised of a solid configuration in which to increase strength and improve durability of the retainer 20. The retainer 20 is further preferably comprised of an integral molded structure to increase strength and durability of the retainer 20.

The tip 30 includes a sharp point 32 capable of piercing the ear 18 or other object and a shoulder 34 opposite the point 32. The shoulder 34 connects with the first end 42 of the shaft 40 and is preferably comprised of a greater diameter than the first end 42 of the shaft 40 so that the ear tag 15 may be positioned upon the shaft 40 and retained upon the retainer 20 by the shoulder 34 of the tip 30. The shoulder 34 is also preferably slightly rounded so as to allow the ear 18 or other object to smoothly slide past the tip 30 and onto the shaft 40. The tip 30 may also require adjustment in size to correspond with the size of the animal and thickness of the ear 18 the retainer 20 will be applied to and the overall dimensions of the identification tag 15 to be applied.

The shaft 40 is comprised of an elongated configuration so as to properly extend through the ear 18. The shaft 40 is preferably longer than the width of the ear 18 so as to prevent excess compression in the ear 18 puncture area thus decreasing bacteria trapped near 18 the retainer 20 and preventing blood circulation from being cut off near 18 the retainer 20. The shaft 40 is also preferably comprised of a substantially cylindrical shaped configuration so as to smoothly slide through the ear 18. The shaft 40 is further preferably tapered, wherein the shaft 40 tapers outwardly from the first end 42 to the second end 43 to further increase strength of the shaft 40. The shaft 40 also has a larger diameter to prevent bending during the application process of the present invention to the retainer 20. The shaft 40 connects to the base 50 at the second end 43 of the shaft 40 and forms a rounded edge 45 at the connection. The rounded edge 45 serves to increase the overall strength of the retainer 20.

The base 50 is comprised of a dome-shaped structure. The dome-shape of the base 50 helps to retain the retainer 20 upon the ear 18 properly and in a stable manner to prevent the retainer 20 from becoming loose or being removed from the ear 18 when not desired. The perimeter of the base 50 is substantially larger than the perimeter of the shaft 40 so as to extend sufficiently beyond the opening 63 formed in the ear 18 of the animal. The base 50, the shaft 40 and the tip 30 also preferably share a center axis so as to be concentric with each other.

The inner surface 52 is comprised of a flat configuration and the outer surface 53 of the base 50 is comprised of a curved configurations. At least one node 55 (e.g. four nodes 55) extend from the outer surface 53 to temporarily hold the base 50 within the holder 60 so as to maintain the retainer 20 in the desired position when attaching the retainer 20 and identification tag 15 to the ear 18 of the animal. The nodes 55 are preferably evenly spaced from the center of the base 50 to form four equidistant points 32 upon the outer surface 53 of the base 50 from each other. The plurality of nodes 55 are symmetrically positioned about a center of the base 50 of the retainer 20. Using four nodes 55 may help to prevent the retainer 20 from rotating or moving about the holder 60 so as to more easily attach the retainer 20 to the ear 18 of the animal. The nodes 55 may also include a rounded outer end 56 to allow the nodes 55 to more easily be temporarily retained by the holder 60 when attaching the retainer 20 and identification tag 15 to the ear 18 of the animal.

C. Holder

The holder 60 is also comprised of a dome shaped configuration and is utilized to temporarily hold the retainer 20 to a press device 12 in a desired position when attaching the retainer 20 and the identification tag 15 to the ear 18 of the animal. The base 50 of retainer 20 temporarily sits within holder 60, which holder 60 is attached to a press device 12, with the nodes 55 of base 50 assisting in maintaining the retainer 20 in the desired position for properly inserting the tip 30 and shaft 40 into an animal's ear 18. Upon the retainer 20 attaching to the animal's ear, the retainer 20 is released from the holder 60 with the holder 60 remaining attached to the press device 12.

The holder 60 includes an attachment member 62 to connect to the base 50 of the retainer 20, a fastener 65 to extend to or through the press device 12 and a securing member 67 to secure the fastener 65 to the press device 12. The attachment member 62 is comprised of a dome-shaped configuration to mimic the outer surface 53 of the base 50. The attachment member 62 also includes a plurality of openings 63 (e.g. four) to match up with the nodes 55 of the base 50, wherein the nodes 55 are removably positioned within the openings 63 of the attachment member 62 when temporarily placing the retainer 20 within the holder 60 so that the outer surface 53 of the base 50 is positioned within the attachment member 62.

Concentrically extending from the attachment member 62 (away from the retainer 20) is the fastener 65. The fastener 65 is preferably threadably formed. The fastener 65 preferably extends through an aperture 13 in the press device 12. In the preferred embodiment, the fastener 65 extends through the aperture 13 in the jaws of the press device 12, wherein the press device 12 is comprised of pliers. It is appreciated that the fastener 65 may threadably attach to the press device 12 if desired. A securing member 67 is attached to the fastener 65 on an opposite side so as to secure the holder 60 to the press device 12.

D. Operation of Preferred Embodiment

In use, the jaws of the pliers (i.e. press device 12) are opened up and the fastener 65 is extended through the aperture 13 of the press device 12 so that the attachment member 62 is facing the inside of the jaws. It is appreciated that the press device 12 may be a mechanical, hydraulic or any other type of tool that may extend the retainer 20 through the ear 18 of the animal and secure the identification tag 15 to the retainer 20 upon the opposite side of the ear 18. The securing member 67 is then threadably attached to the fastener 65 opposite the attachment member 62 to secure the holder 60 to the press device 12. The base 50 of the retainer 20 is temporarily cradled within the cavity formed by the attachment member 62 so that the nodes 55 extend through the openings 63 of the attachment member 62 and temporarily secure the retainer 20 to the holder 60.

The identification tag 15 is now set in the opposite jaw and retained therein temporarily so as to be aligned with the tip 30 of the retainer 20 when the jaws of the press device 12 are closed. The opposite jaw may include a notch 14 or other recessed portion to receive the identification tag 15. The ear 18 of the animal is now positioned between the tip 30 of the retainer 20 and the tag 15. The jaws are now closed so as to force the tip 30 of the retainer 20 through the ear 18 and secure at least part ways into the identification tag 15 to secure the tip 30 to the identification tag 15. It is appreciated that a locking structure may be utilized between the tip 30 and the identification tag 15 so that the tip 30 is permanently secured to the identification tag 15.

The ear 18 is also forced upon the shaft 40 of the retainer 20 and is prevented from slipping off of the retainer 20 via the identification tag 15 and tip 30 upon the first end 42 of the shaft 40 and the base 50 extending from the second end 43 of the shaft 40. Once the ear 18 is secured upon the retainer 20, the jaws may be opened resulting in the retainer 20 and holder 60 separating with the retainer 20 remaining attached to the ear and the holder 60 remaining attached to the press device 12.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. An ear tag retainer system, comprising:
    a retainer having a base, shaft, tip and a plurality of nodes, wherein said plurality of nodes extend from said retainer base, wherein said tip passes through an animal's ear and into an identification tag to secure the identification tag to an animal; and
    a dome shaped holder attached to a press device for temporarily maintaining the retainer in the desired position for attaching the retainer to an animal's ear, wherein said holder includes a plurality of openings, wherein said plurality of openings receive said plurality of nodes when the retainer is temporarily positioned within the holder.

2. The ear tag retainer system of claim 1, wherein said plurality of nodes are symmetrically positioned about a center of said retainer.

3. The ear tag retainer system of claim 2, wherein said plurality of nodes include four nodes.

4. The ear tag retainer system of claim 1, wherein said nodes include a rounded outer end.

5. The ear tag retainer system of claim 1, including a press device to which the holder is secured and remains after the retainer is attached to the animal's ear.

6. The ear tag retainer system of claim 5, wherein said holder threadably attaches about said press device.

7. The ear tag retainer system of claim 5, wherein said press device is comprised of a pliers tool.

8. The ear tag retainer system of claim 1, wherein said shaft extend from said tip and said base extends from said shaft.

9. The ear tag retainer system of claim 8, wherein said plurality of nodes extend from said base.

10. The ear tag retainer system of claim 8, wherein said shaft is tapered.

11. The ear tag retainer system of claim 10, wherein said shaft includes a rounded edge at an inner end of said shaft.

12. The ear tag retainer system of claim 8, wherein said base is comprised of a dome shape.

13. The ear tag retainer system of claim 1, wherein said holder includes an attachment member comprised of a dome shape to mimic said shape of said base.

14. The ear tag retainer system of claim 1, wherein said retainer is comprised of a solid integrally formed structure.

15. An ear tag retainer system, comprising:
    a retainer having a base, shaft, tip and nodes, wherein said nodes extend from said retainer, wherein said retainer is adapted to secure an identification tag to an animal;
    wherein said nodes are symmetrically positioned about a center of said retainer;
    wherein said retainer is comprised of a solid integrally formed structure;
    wherein said retainer tip passes through an animal's ear and into an identification tag with the tip maintained on one side of the animal's ear, the shaft maintained within the animal's ear and the base on the opposite side of the animal's ear;
    a dome shaped holder attached to a press device for temporarily holding the retainer in the desired position for attaching the retainer and identification tag to an animal's ear;
    wherein said holder includes a plurality of openings for temporarily receiving said nodes when cradling the retainer;
    wherein said holder maintains the retainer in the desired position for inserting said tip into an animal's ear; and
    wherein once the tip has passed through the animal's ear, the press device and attached holder are released resulting in the holder and retainer separating.

16. The ear tag retainer system of claim 15, wherein said press device is comprised of a pliers tool.

17. The ear tag retainer system of claim 15, wherein said holder threadably attaches about said press device.

18. The ear tag retainer system of claim 15, wherein said retainer includes a base comprised of a dome shape.

19. The ear tag retainer system of claim 18, wherein said holder includes an attachment member comprised of a dome shape to mimic said shape of said base.

20. An ear tag retainer system, comprising:
    a retainer including a plurality of nodes;
    wherein said plurality of nodes extend from said retainer, wherein said retainer is adapted to secure an identification tag to an animal;
    wherein said retainer includes a tip, a shaft extending from said tip and a base extending from said shaft;
    wherein said plurality of nodes extend from said base;
    wherein said plurality of nodes are symmetrically positioned about a center of said retainer and wherein said plurality of nodes include four nodes;
    wherein said plurality of nodes include a rounded outer end;
    wherein said shaft is tapered;
    wherein said shaft includes a rounded edge at an inner end of said shaft;
    wherein said base is comprised of a dome shape;
    wherein said retainer is comprised of a solid integrally formed structure;
    a holder including a plurality of openings, wherein said plurality of openings receive said plurality of nodes when attaching said identification tag to said animal;
    wherein said holder includes an attachment member comprised of a dome shape to mimic said shape of said base; and
    a press device to secure said holder, wherein said holder threadably attaches about said press device.

* * * * *